United States Patent Office 3,252,877
Patented May 24, 1966

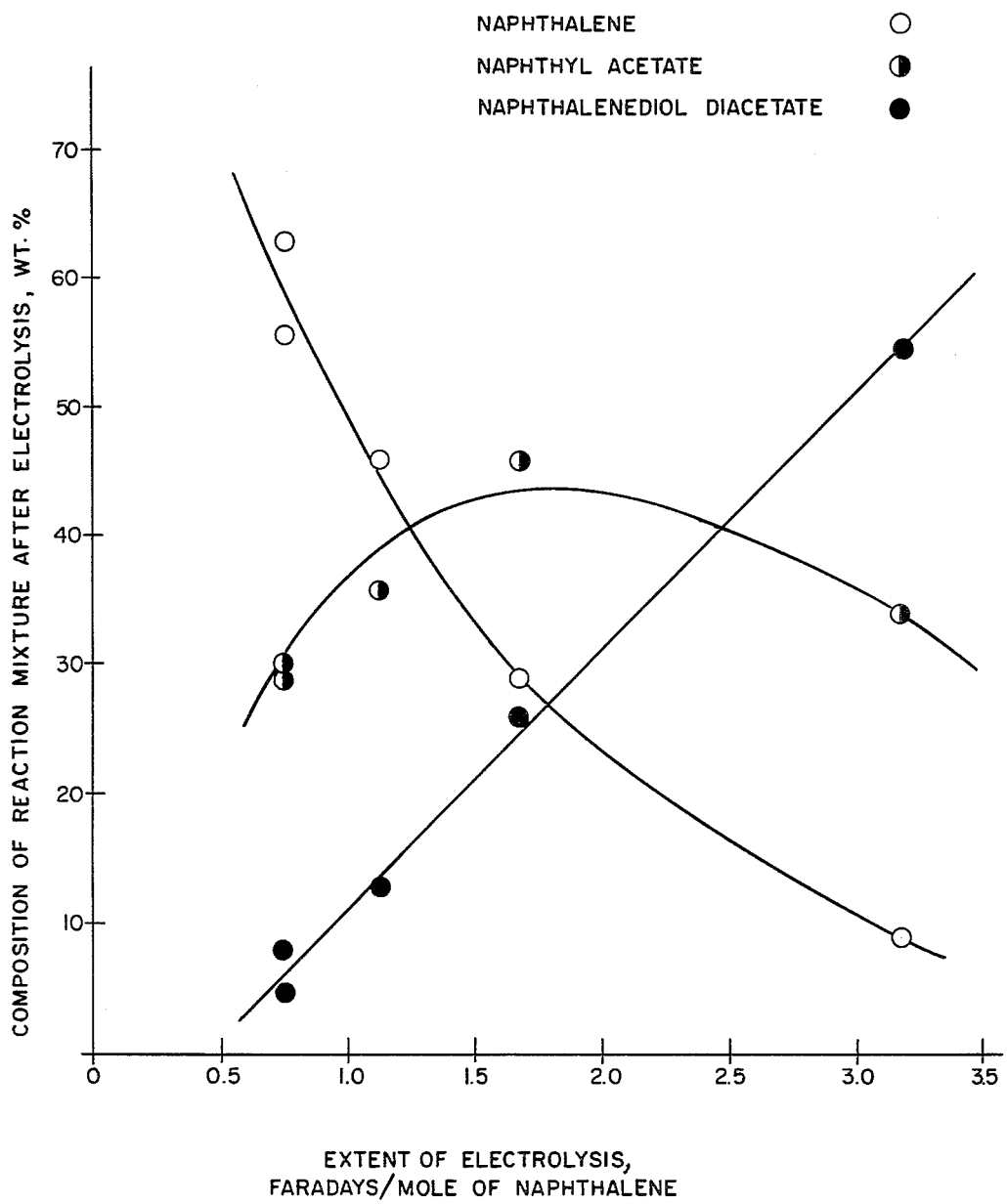

3,252,877
ELECTROCHEMICAL PREPARATION OF ACYL-OXY DERIVATIVES OF CONDENSED RING AROMATIC COMPOUNDS
William J. Koehl, Jr., Yardley, Pa., assignor to Socony Mobil Oil Company, Inc., a corporation of New York
Filed Dec. 12, 1963, Ser. No. 330,061
16 Claims. (Cl. 204—59)

This invention relates to the electrochemical preparation of acyloxy derivatives of aromatic compounds having two or more condensed rings. The method is characterized by the improved yields obtainable, and by the synthesis of derivatives not heretofore prepared electrochemically.

Among other advantages, the invention is distinguished by the presence of little or no by-products, a fact which reduces waste of starting material, further contributes to the yield of desired product, and increases the ease of separation and purification of the product. The invention also makes it possible to prepare products which are difficult to obtain by other methods.

Of particular interest is the flexibility of the method, according to which a variation in only one operating condition, namely, the quantity of electricity passed through the solution being electrolyzed, favors the formation of a particular derivative in greater concentration than another derivative.

The invention comprises electrolyzing an anhydrous solution comprising the aromatic compound, an alkanoic acid, an alkali metal salt of the latter, and the anhydride of the acid by passing current from an anode of lead dioxide to a cathode immersed in the solution under the conditions herein described to produce an acyloxy derivative of the aromatic, and recovering the same. The invention makes use of novel operating conditions, including the use of an anode of lead dioxide and an anhydrous solution; and it provides for the formation of a number of products by controlling the extent of the conversion of the aromatic compound.

Considering the invention in detail, the condensed ring aromatic compound includes compounds having only 6-membered rings, and also compounds having both 6- and 5-membered rings. Illustrative 6-membered ring compounds are napththalene, acenaphthene, anthracene, phenanthrene, perylene, pyrene, chrysene, triphenylene, pentacene, fluoranthrene, and the like. Compounds having a 5-membered ring include indene, hydrindene, etc. Also suitable are compounds containing 5- and 6-membered rings in which a 6-membered ring may be heterocyclic, as in quinoline, isoquinoline, dibenzofuran, dibenzopyridine, phenanthridine, phenanthroline, phenazine; or in which a 5-membered ring may be heterocyclic, as in coumarone and thianapthene, etc. Other compounds are those containing the cyclopentanophenanthrene nucleus.

Suitable alkanoic acids are the C–2 to C–10 acids, and preferably the C–2 to C–6 acids such as acetic, propionic, butanoic and pentanoic and their isomers, and the various hexanoic acids. Branched as well as straight chain acids are useful, including such acids as 2-methylbutyric, 3-methylbutyric, and trimethylacetic. It is preferred to use the acid in an anhydrous state.

The alkali metal salt of the acid is preferably a salt of the acid that is present and preferably too is the sodium or potassium salt, although lithium and quaternary ammonium salts are suitable. It will be understood that the salt may be added per se to the solution or formed in situ as by addition of a base like KOH or NaOH and reaction of the latter with part of the free carboxylic acid.

The acid anhydride to be used is preferably that of the alkanoic acid which is present. As indicated, the solution to be electrolyzed is an anhydrous one, it being considered that such a solution helps to reduce the formation of by-products. The acid anhydride helps maintain the anhydrous state of the solution. Use of the anhydride in this way is convenient, but it may be omitted if all of the other materials are initially anhydrous. Also, other inert anhydrous solvent materials, such as acetonitrile, may be used instead of the anhydride.

The condensed ring aromatic compound is usually a solid at the temperatures involved, as is also the salt of the alkanoic acid. The acid itself and the acid anhydride are usually liquid and together comprise the solvent in which the other components are dissolved. If the anhydride is omitted, the acid alone comprises the solvent; in some cases the solvent may comprise the acid and an added component like acetonitrile. Whatever its composition, the solvent should have suitable solvent action and a suitable dielectric constant.

The composition of the solution to be electrolyzed may be given in relation to the liquid solvent. On this basis, the amount of condensed ring aromatic is 20 to 500, preferably 100 to 300 g./l. of solvent; and the alkanoic acid salt ranges from 20 to 500, preferably 50 to 150 g./l. of solvent. The alkanoic acid may comprise 10 to 100%, preferably 40 to 60%, of the solvent, while the acid anhydride may comprise 90 to 0%, preferably 60 to 40% of the solvent.

The current density may be maintained over a fairly wide range, say 0.001 to 0.5, and more preferably 0.01 to 0.26 amp./sq. cm. At higher values polyacyloxy derivatives tend to be favored, and mono derivatives at lower values. Generally, 0.09 to 0.10 amp./sq. cm. is suitable for mono and diacyloxy derivatives. As is known, the current density value determines the rate or speed of the electrolysis. Applied voltage is supplied by an suitable D.C. source.

The quantity of electricity passed through the solution is also conveniently expressed in terms of faradays per mole of aromatic compound. Considering a reaction which involves a change of one electron, a faraday is defined as the amount of electricity which is required to convert one mole of the aromatic compound. In the present work, a faraday is considered to be the product of current and time, and one faraday is equal to 26.8 ampere hours. On this basis, the number of faradays may range from less than 0.5 up to about 11 or more per mole of aromatic compound. The faraday value determines the extent of substitution.

Room temperatures are preferred, e.g., 20 to 30° C., although higher temperatures are useful, going to the boiling point of the solution. The current efficiencies are in the range of 50 to 90%. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, or neutral, but preferably is on the acid side, and suitably may range from pH of 4 to 6, more broadly from 2 to 7.

The preferred anode is lead dioxide for the reason that its use minimizes by-product formation. In particular very little gaseous by-products like carbon dioxide, methane, and ethane are formed with lead dioxide, the amounts being substantially less than with other anodes. Furthermore, undesirable heavier by-products like methylnaphthalene and naphthoquinone are practically never observed, although they are usually observed at other anodes. It is of interest to note that when acetic acid is present in the solution, it is possible for the conventional Kolbe electrolysis to take place, according to which this acid is converted to methane, ethane, and carbon dioxide; thus the composition of the off gas affords an indication of the relative rates of acetoxylation and of the Kolbe electrolysis. The Kolbe type reaction may also occur with acids other than acetic, and in each such case the hydrocarbons formed are the conventional ones. Typical analyses of the off gas, using an anode of lead dioxide and with acetic acid present, show that there were formed only 0.2 mole percent of methane, 0.2 mole percent of ethane, and 0.2 mole percent of carbon dioxide; with a platinum anode the corresponding analyses were 0.7 mole percent methane, 0.6 mole percent ethane, and 10.4 mole percent carbon dioxide; with a carbon anode the analyses were 0.7 mole percent methane, 1.2 mole percent ethane, and 6.3 mole percent carbon dioxide. Even though less desirable than lead dioxide, it is possible to use platinum or carbon as the anode material since both are operative for the preparation of acyloxy derivatives although it will be understood that each leads to lower yields and to greater by-product formation.

The cathode may be carbon or graphite or any inert metal such as copper, stainless steel, platinum, silver, nickel, lead, etc. Forms of the electrodes are conventional.

The product or products are formed at the anode by anodic oxidation. The anolyte may be distilled or fractionated to recover the product, or it may be worked up by crystallization techniques, but preferably the reaction mixture is first diluted with water and then subjected to conventional extraction with a conventional solvent such as ether. Thereafter the extract may suitably be separated by distillation or recrystallization procedures.

In general, by conducting the electrolysis until a minor fraction of the aromatic compound has been converted, it is found that the predominant product is the monoacyloxy derivative. By continuing the electrolysis further, that is, by increasing the quantity of electricity passed through the solution until at least half of the aromatic has been converted, not only is the monoacyloxy derivative formed but also the diacyloxy derivative, both in good yields. Further progress of the electrolysis, using even larger quantities of electricity, results in the formation of higher derivatives, including tri- and tetraacyloxy derivatives, in good yields. It is possible to produce substantially only the mono derivative by initially converting only a minor fraction of the aromatic compound, then removing the formed mono product from the solution, continuing the conversion and removing mono product, and proceeding in this way until substantially all of the aromatic is converted to mono derivative.

It may be convenient to refer to the electrolysis, and in particular to the acetoxylation, of an illustrative material such as naphthalene, which also constitutes a preferred material. At least four acetate groups can be successfully attached to the naphthalene nucleus by anodic acetoxylation. The main determinant of the extent of substitution is the quantity of electricity passed through the solution. The relationship of the product distribution to the duration of the electrolysis is shown in the accompanying drawing wherein the composition of the reaction mixture after electrolysis is plotted against the extent of electrolysis in terms of faradays per mole of naphthalene. It will be seen that the reaction mixture comprises unchanged naphthalene as well as acetoxy derivatives thereof. It is apparent that as the electrolysis proceeds, the amount of naphthalene in the reaction mixture decreases steadily. It is also apparent that the first product formed is the mono derivative and that it is formed in good yields. Above about 0.5 faraday, however, the di derivative appears and its concentration increases linearly at least up to about 3 faradays, whereas the concentration of mono reaches a peak at about 1.7 faradays and then decreases slowly.

Referring to the drawing, in order to make monoacyloxy derivatives substantially free from higher derivatives, it is preferred to pass up to 0.5 faraday of electricity through the solution, thereby converting up to about 25% by weight of the naphthalene to a mono derivative. The latter is substantially the only derivative formed and comprises up to about 25% by weight of the total amount of naphthalene-containing compounds present in the reaction mixture, the balance of such compounds comprising napthalene itself. (By the expression "naphthalene-containing compound" is meant a compound containing the condensed ring structure of naphthalene, and it includes both naphthalene derivatives and unreacted naphthalene.) At this point the electrolysis is stopped, the derivative is removed from the reaction mixture, while the unreacted naphthalene is returned to the solution and the electrolysis is continued. By repeating the foregoing steps, an ultimate yield of the mono derivative of about 90% by weight based on naphthalene can be obtained.

A mixture of substantial amounts of both mono and di derivatives is obtainable over a range of about 1.1 to 4.0 faradays. At about 1.1 faradays the mixture is preponderantly mono, there being about three times as much mono as di, while at about 2.5 faradays, the proportions are approximately equal. The concentration of di in the mixture is favored at 3.0 faradays and above, and as indicated by the curves, appears to predominate.

The yield of the diacetate may be substantially increased by operating at 3.0 to 4.0, preferably about 3, faradays to form a reaction mixture containing about 40 to 55% by weight of the di derivative, stopping the electrolysis to remove the diacetate, returning to the solution the unreacted naphthalene and the mono derivative, and continuing the electrolysis in this manner until substantially all of the latter compounds are converted to diacetate.

Another method of forming the di derivative is to use the mono derivative as the starting material, as illustrated in Example 6. This procedure is simpler to the extent that naphthalene is eliminated from the reaction mixture.

By increasing the amount of electricity above 3 or 4 faradays, higher derivatives may be formed. Thus, by increasing it to about 8 to 11 faradays per mole of naphthalene, or 6 to 9 faradays per mole of monoacetoxy naphthalene where the latter is used in place of naphthalene, and by continuing the electrolysis to convert at least 90% of the starting material, polyacetoxy derivatives are formed comprising about 20% by weight or more of the di derivative and about 70% by weight or more of a mixture of tri and tetra derivatives, based on the total naphthalene-containing compounds present. After cessation of the electrolysis, the reaction mixture may be extracted with a suitable solvent to remove the poly derivatives, and individual derivatives may be isolated by crystallization techniques.

Another method of controlling the selectivity of the product comprises varying the alkali metal salt concentration. Thus, as illustrated in Example 4, by reducing the concentration of sodium acetate by a factor of 10, the formation of diacetate was suppressed, the only derivative formed being 1-acetoxy naphthalene. The result of Example 4 was secured by limiting the sodium acetate concentration to a value below the lower limit of 20 grams per liter of solvent.

Conversely, the formation of the di derivative may be increased over the mono by increasing the sodium acetate concentration, as set forth in Example 5. In the latter, the salt concentration was doubled over that in Example 1, with a 3-fold increase in diacetate formation.

It may be noted that monoacetoxy naphthalene is also termed naphthyl acetate; diacetoxy naphthalene is also naphthalenediol diacetate; etc.

Other derivatives of naphthalene that may be formed are the propionates, butyrates, isobutyrates, valerates, caprylates, etc. Most of the mono derivatives of the foregoing, with the substitution in the 1-position, are oily compounds at room temperatures, although substitution in the 2-position produces several normally solid derivatives. The di derivatives are usually solid at room temperature, as are the higher derivatives. Acyloxy derivatives of other condensed ring aromatics of the kind indicated may be prepared in the manner described for the acetoxylation of naphthalene.

The invention may be illustrated by the following examples.

EXAMPLE 1

The formation of monoacetoxy naphthalene was carried out as follows. A mixture of 8.2 g. of sodium acetate, 25.6 g. of naphthalene, 60 ml. of glacial acetic acid, and 60 ml. of acetic anhydride was placed in a cell which consisted of a cylindrical glass cell 5.0 cm. in diameter and 15 cm. in height fitted with a reflux condenser and a thermometer. The cathode was a copper cylinder 3.0 cm. in diameter and 5.0 cm. in height which was concentric with a ¼ in. diameter carbon rod. The anode was lead dioxide, formed by plating lead dioxide on a ¼-inch diameter carbon rod, using a plating solution containing 400 g. lead nitrate and 25 g. copper nitrate per liter, a temperature of 40–50° C., a current density of 0.05 amp./sq. cm., a time of 1.5 hours, and adding 7.0 g./l. of yellow lead oxide (PbO) at 15-minute intervals to prevent production of excessive acid.

The solution was electrolyzed at 70° C. with a current of 1.5 amp. at 47 v. for 160 min., this corresponding to 0.15 faraday. The current density was about 0.1 amp. per sq. cm. During passage of the current the anode was rotated at about 2500 r.p.m. The resulting very light yellow-colored cell liquid was added to 1 liter of water, the suspension extracted with ether, and 33.8 g. of nearly white solid was obtained from the ether. This was found by vapor phase chromatographic analysis to comprise 56% naphthalene, 29% naphthyl acetate, and 8.0% naphthalenediol diacetate, weight basis, the balance comprising higher acetates. No naphthol, naphthoquinone, or methylnaphthalene was detected.

An identical experiment gave 27.7 g. of white solid which was found to comprise 63% naphthalene, 30% naphthyl acetate, and 5% naphthalenediol diacetate.

The two product mixtures were combined. Sublimation at 1–2 mm. and 90–100° C. gave 34.7 g. of naphthalene. Distillation of the residue gave 6.6 g. of a product, B.P. 110° C. at 1–2 mm., which had an infrared spectrum practically identical with that of 1-naphthyl acetate.

Hydrolysis of the naphthyl acetate product by refluxing the same in 5% aqueous KOH solution for one hour and ultraviolet spectrophotometric analysis of the hydrolyzate showed the naphthyl acetate to comprise 94.5% of 1-naphthyl acetate and 5.5% of 2-naphthyl acetate.

EXAMPLE 2

A mixture of approximately equal parts of the monoacetoxy and diacetoxy derivatives of naphthalene, together with higher derivatives, was prepared by first making up a solution comprising 25.6 g. naphthalene, 16.4 g. sodium acetate, and 130 ml. of a 1:1 mixture of acetic acid and acetic anhydride. This was placed in the cell of Example 1. Using the same anode and cathode as in said example, 3.1 faradays of electricity per mole of naphthalene were passed through the solution, giving a yellow liquid product mixture which was found by gas chromatography to contain 10% naphthalene, 28% of naphthyl acetate, 31% naphthalenediol diacetate, and the balance higher polyacetoxy derivatives. The very viscous mixture (36.0 g.), after standing for two months, deposited white crystals (4.0 g.), M.P. 127–131° C. (M.P. 128–131° C. after recrystallization from 95% ethanol). By comparison, 1,4-naphthalenediol diacetate melts at 130° C. The infrared spectrum of the recrystallized material was identical to that of authentic 1,4-naphthalenediol diacetate made by acetylation of 1,4-naphthalenediol with acetic anhydride.

EXAMPLE 3

A tetraacetoxy as well as lower derivatives of naphthalene were prepared from the monoacetoxy compound by electrolyzing a solution of 25.3 g. of 1-naphthyl acetate, 16.4 g. sodium acetate, and 130 ml. of a 1:1 mixture of acetic acid and acetic anhydride. A current of 6.0 faradays per mole of naphthyl acetate (3.0 amp., 44 to 47 v., 77 to 90° C.) was passed from a lead dioxide anode to a copper cathode in the cell of Example 1, giving a product mixture (34.3 g.) which was found by gas chromatography to contain 2% of naphthyl acetate, 22% of naphthalenediol diacetate, and 76% of a non-volatile residue containing higher derivatives. From the total product mixture 12% of a material, M.P. 240–295° C. was isolated. After recrystallization, this material had a M.P. of 292–296° C. and was found to contain 59.6% of carbon and 4.3% of hydrogen. (Calculated for a naphthalenetetraol tetraacetate, 60.0% C. 4.4% H.) Infrared spectrum of the material was consistent with that of an acetoxynaphthalene. The highest melting tetraacetoxynaphthalene known is the 1, 4, 5, 8 isomer, M.P. 277–279° C., and although this melting point is lower than that found, this is not necessarily considered inconsistent as melting points in this high range are subject to large errors.

EXAMPLE 4

In order to favor the formation of monoacetate over diacetate, the concentration of alkali metal salt was reduced by a factor of 10 over that of Example 1. Thus, a solution was prepared comprising 25.6 g. of naphthalene, 0.82 g. of sodium acetate, and 130 ml. of a 1:1 mixture of acetic acid and acetic anhydride. On the basis of 1 liter of solvent, the solution contained about 196 g. of naphthalene and only about 6.3 g. sodium acetate. This mixture was electrolyzed, using the same cell, anode, and cathode as in Example 1. A current of 5 to 7 ampere hours per 0.2 mole of naphthalene, corresponding to approximately 1 faraday/mole, was passed through the solution. Analysis of the product by vapor phase chromatography showed the reaction mixture to contain about 34% of monoacetoxy derivative and 64% of unchanged naphthalene, weight basis. No diacetate was detected. The sensitivity of the analysis was such that diacetate, if present, would be less than 3% by weight.

EXAMPLE 5

A solution of 25.6 g. of naphthalene, 16.4 g. sodium acetate, and 130 ml. of a 1:1 mixture of acetic acid and acetic anhydride was prepared and electrolyzed in the cell and using the electrodes of Example 1. After 1.2 faradays of electricity had been passed through the solution, the electrolysis was stopped. Analysis of the reaction mixture showed that it contained a trace of naphthalene, 5% of the mono derivative, and 23% of the di derivative, weight basis. The balance of the mixture comprised higher substitution products.

EXAMPLE 6

To prepare the diacetate derivative from the monoacetate, the work of Example 5 was repeated except that 1-acetoxy naphthalene was used instead of naphthalene, and except that a greater quantity of electricity was used, namely, 6 faradays per mole of naphthyl acetate. The reaction mixture contained 2% of mono, 22% of di, and the balance comprised higher polyacetoxy compounds. A portion of the balance, comprising about 12%, was isolated as an ether-insoluble white powder, M.P. 240–295° C.

EXAMPLE 7

The formation of the tetraacetoxy derivative from the monoacetoxy compound was again demonstrated using a solution comprising 40 g. of 1-naphthyl acetate, 15 g. of sodium acetate, 125 ml. of glacial acetic acid, and 125 ml. of acetic anhydride, plus in addition 15 g. of another salt of the formula

$(C_4H_9)_4NOCOCH_3 \cdot CH_3COOH$

The cell and electrodes were those of Example 1. Nine faradays per mole of naphthyl acetate, corresponding to 11 faradays per mole of naphthalene, were passed through the solution. The current density was about 0.1 amp./sq. cm. Only the tetraacetoxy derivative was isolated, the amount being about 6% by weight based on the starting monoacetate compounds.

If desired, the anode may be rotated during the course of the electrolysis to secure good stirring, and if also desired it may be subjected to an ultrasonic field for the purpose of maintaining its surfaces free of any deposits. Oxygen is preferably excluded from the atmosphere over the solution being electrolyzed to avoid undesirable oxidation of reactants and products. The acetoxy derivatives of naphthalene are of value as intermediates, suitably for conversion to naphthols, which are useful as anti-oxidants for various hydrocarbon fractions, such as lubricating oil, and which themselves serve as intermediates for synthesizing other compounds having anti-oxidant value. Hydrolysis of the acetoxy compounds to form naphthols is a conventional reaction. The diacetoxy naphthalenes are also of interest for making linear polymers.

As indicated, in the acetoxylation of naphthalene, the mixture of acetic acid and acetic anhydride is considered to function as a solvent for the other components of the solution and also for the various products of electrolysis. Another solvent that is useful is anhydrous acetonitrile, which may be used in the same amounts as the anhydride which it replaces. Another but less preferred solvent is dimethylformamide, which has suitable solvent properties but which leads to excessive methane and carbon dioxide formation, probably through reaction of the solvent. In general, any solvent or solvent mixture may be used, and in the amounts described, which dissolves the reactants and provides suitable conductivity, and which of course does not itself undergo reaction, i.e., has a sufficiently high oxidation potential as to be stable at the anode. Whatever solvent is employed, it is desirable to avoid the presence of water, which may undergo electrolysis and which usually results in darkly colored reaction mixtures.

It will be understood that the invention is capable of obvious variations without departing from its scope.

In the light of the foregoing description, the following is claimed:

1. Method for the electrochemical preparation of a monoacyloxy derivative of a condensed ring aromatic which comprises electrolyzing an anhydrous solution of said aromatic, an alkanoic acid, an alkali metal salt of an alkanoic acid, and an alkanoic acid anhydride by passing up to 0.5 faraday of electricity per mole of aromatic through said solution from an anode to a cathode to convert up to about 25% by weight of the aromatic to a monoacyloxy derivative, said derivative being substantially the only acyloxy derivative that is formed and comprising up to about 25% by weight of the total aromatic-containing compounds present in the resulting solution with the balance of such compounds comprising the aromatic itself, then ceasing the electrolysis, removing said derivative from the solution, continuing the electrolysis to convert the unreacted aromatic, and repeating the foregoing derivative-removal step and the unreacted aromatic-conversion step to produce a yield of said derivative of at least about 80% by weight based on the aromatic.

2. Method for the electrochemical preparation of mono- and diacyloxy derivatives of a condensed ring aromatic which comprises electrolyzing an anhydrous solution of said aromatic, an alkanoic acid, an alkali metal salt of an alkanoic acid, and an alkanoic acid anhydride, passing about 1.1 to 4.0 faradays of electricity per mole of aromatic through said solution from an anode to a cathode to convert at least about 80% by weight of the aromatic to acyloxy derivatives comprising mainly said mono- and diacyloxy derivatives, then ceasing the electrolysis, and removing said derivatives from the solution.

3. Method for the electrochemical preparation of polyacyloxy derivatives of a condensed ring aromatic which comprises electrolyzing an anhydrous solution of said aromatic, an alkanoic acid, an alkali metal salt of an alkanoic acid, and an alkanoic acid anhydride by passing at least about 8 faradays of electricity per mole of aromatic through said solution from an anode to a cathode to convert at least about 90% by weight of the aromatic to polyacyloxy derivatives, said derivatives comprising at least 20% by weight of diacyloxy derivative and at least 70% by weight of tri- and tetraacyloxy derivatives based on the total aromatic-containing compounds present, then ceasing the electrolysis, and removing said derivatives from the solution.

4. Method for the electrochemical preparation of a tetraacyloxy derivative of a codensed ring aromatic which comprises electrolyzing an anhydrous solution of said aromatic, an alkali metal salt of an alkanoic acid, and an alkanoic acid anhydride by passing at least about 8 faradays of electricity per mole of aromatic through said solution from an anode to a cathode to convert at least about 90% by weight of the aromatic to polyacyloxy derivatives, extracting the resulting reaction mixture with a solvent to remove polyacyloxy derivatives therefrom, and crystallizing from the resulting extract a tetraacyloxy derivative of the aromatic in a yield of at least 10% by weight based on the total aromatic-containing compounds present in said reaction mixture.

5. Method for the electrochemical preparation of an acyloxy derivatives of a condensed ring aromatic compound in good yield which comprises preparing an anhydrous solution of said aromatic compound and a salt of an alkanoic acid in a solvent comprising an alkanoic acid, passing through the solution 0.5 to 11 faradays of electricity per mole of aromatic compound, thereby to form an acyloxy derivative of said aromatic compound, continuing to pass current until up to about 25% by weight of said aromatic compound has been converted to said derivative, and recovering the latter.

6. Method of claim 5 wherein said alkanoic acid has 2 to 6 carbon atoms.

7. Method of claim 5 wherein said salt is the salt of said acid.

8. Method of claim 5 wherein said aromatic compound is naphthalene, said alkanoic acid is acetic acid, and said salt is an alkali metal acetate.

9. Method for the electrochemical preparation of a monoacyloxy derivative of a condensed ring aromatic compound which comprises preparing an anhydrous solution of said aromatic compound, an alkanoic acid, and an alkali metal salt and an anhydride of said acid, passing current through said solution from an anode of lead dioxide to a cathode at a current density of 0.001 to 0.5 amp./sq. cm. until up to about 25% of said aromatic compound has been converted to a monoacyloxy derivative, and recovering at least 20% by weight of said derivative.

10. Method for the electrochemical preparation of a diacyloxy derivative of a condensed ring aromatic compound which comprises preparing an anhydrous solution of said aromatic compound, an alkanoic acid, and an alkali metal salt and an anhydride of said acid, passing current through said solution from an anode of lead dioxide to a cathode at a current density of 0.001 to 0.5 amp./sq. cm. until at least 80% by weight of aromatic compound has been converted and recovering at least 20% by weight of a diacyloxy derivative of said compound.

11. Method for the electrochemical preparation of a tetraacyloxy derivative of a condensed ring aromatic compound which comprises preparing an anhydrous solution of said aromatic compound, an alkanoic acid, and an alkali metal salt and an anhydride of said acid, passing current through said solution from an anode of lead dioxide to a cathode at a current density of 0.001 to 0.5 amp./sq. cm. until at least 90% by weight of aromatic compound has been converted, and recovering at least 10% by weight of a tetraacyloxy derivative of said compound.

12. Method for the electrochemical preparation of an acyloxy derivative of a condensed ring aromatic compound in good yield which comprises preparing an anhydrous solution comprising, per liter of a solvent comprising an alkanoic acid and an anhydride of said acid, 20 to 500 g. of said aromatic compound and 20 to 500 g. of an alkali metal salt of said alkanoic acid, passing current through said solution from an anode of lead dioxide to a cathode at a current density of 0.001 to 0.5 amp./sq. cm., thereby to form an acyloxy derivative of said aromatic compound, continuing to pass current until at least about 25% by weight of said aromatic compound has been converted to said derivative, and recovering the latter.

13. Method of claim 12 wherein said alkanoic acid has 2 to 6 carbon atoms.

14. Method of claim 12 wherein said anhydride is the anhydride of said acid and said salt is the salt of said acid.

15. Method of claim 12 wherein said aromatic is naphthalene, said alkanoic acid is acetic acid, said salt is an alkali metal acetate, and said anhydride is acetic anhydride.

16. Method for the electrochemical preparation of polyacyloxy derivatives of a condensed ring aromatic compound which comprises electrolyzing an anhydrous solution comprising a monoacyloxy derivative of said compound, an alkanoic acid, and an alkali metal salt and an anhydride of said acid by passing at least about 6 faradays of electricity per mole of said monoacyloxy derivative through said solution from an anode to a cathode to convert at least about 90% by weight of said derivative to polyacyloxy derivatives, said derivatives comprising at least 20% by weight of diacyloxy derivative and at least 70% by weight of tri- and tetraacyloxy derivatives, then ceasing the electrolysis, and removing said derivatives from the solution.

No references cited.

JOHN H. MACK, *Primary Examiner.*